Figure 1:
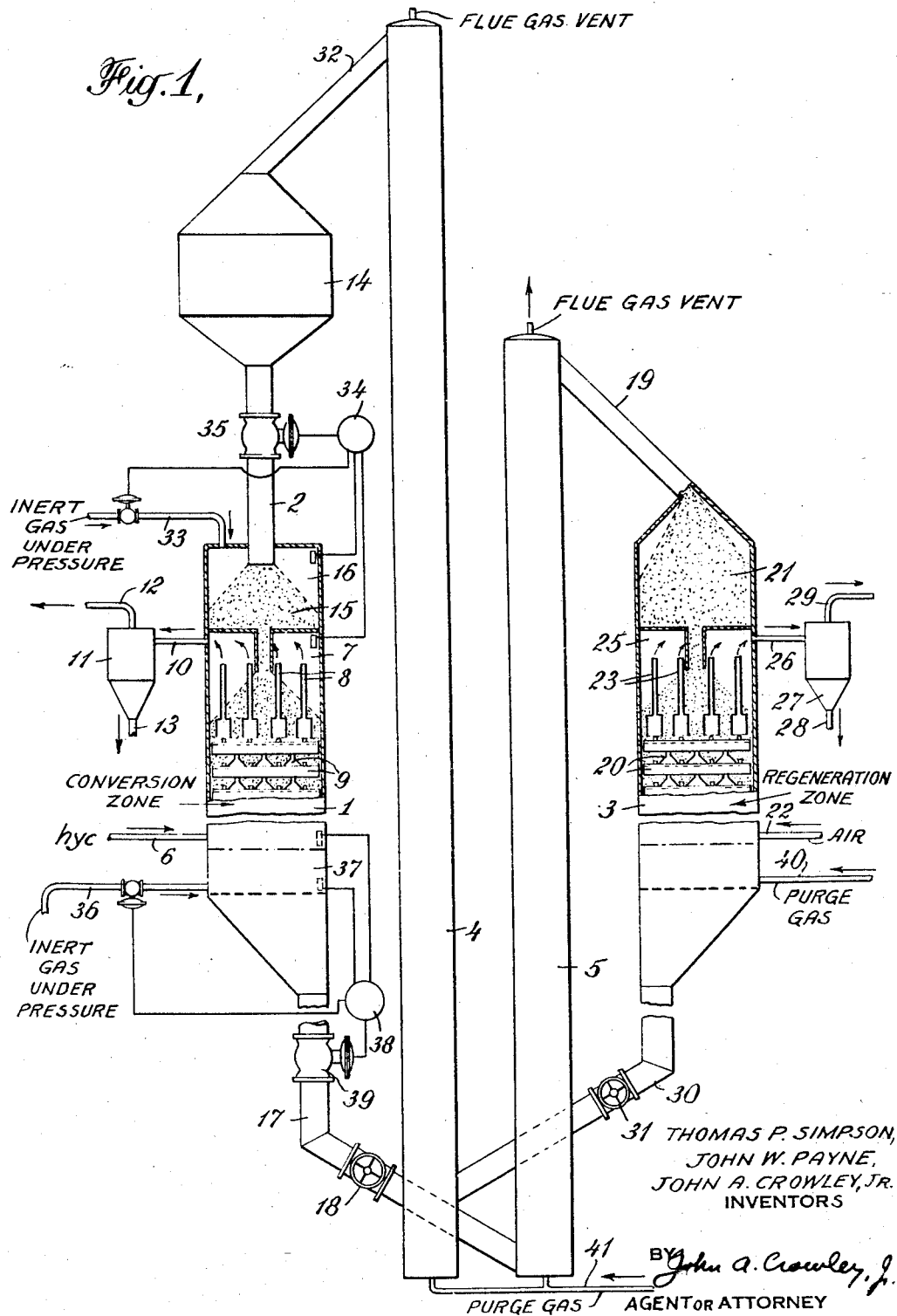

Patented May 24, 1949

2,471,398

UNITED STATES PATENT OFFICE 2,471,398

CONTINUOUS CATALYTIC SYSTEM

Thomas P. Simpson and John W. Payne, Woodbury, N. J., and John A. Crowley, Jr., New York, N. Y., assignors to Socony-Vacuum Oil Company, Incorporated, a corporation of New York Application June 15, 1946, Serial No. 676,984

13 Claims. (Cl. 196—52)

This application is a continuation-in-part of application Serial Number 441,316, filed in the United States Patent Office on May 1, 1942, now Patent Number 2,410,309.

This invention is concerned primarily with a continuous catalytic system for cracking heavier petroleum fractions, e. g., gas oil, to gasoline in the presence of solid catalyst particles requiring periodic regeneration. However, the invention also relates more broadly to any hydrocarbon conversion reaction in the presence of such catalysts, as, for example, polymerization of hydrocarbon gases, reforming naphtha, treating gasoline, etc., as well as systems in general wherein a solid particle contact material is introduced to an enclosed zone operating under pressure for contact with a gaseous material therein.

Catalytic cracking is now a well established part of the petroleum industry and the operating conditions and the catalysts therefor are rather well known, including the regeneration of the spent catalysts. Thus, the Simpson et al. Patents 2,185,930 and 2,185,931 disclose such operations. Temperatures of around 750° to 975° F. and pressures between about atmospheric and 30 pounds per square inch are considered most desirable for cracking although it is realized there may be variations. Similarly, alumina-silica catalysts, either natural or synthetic, are preferred; however, other catalysts have been proposed and may be used. Likewise, it now is realized the regeneration temperature for burning off carbonaceous matter with air should be controlled between about 850° and about 1200° F. In the same manner, operating conditions and the catalysts for other hydrocarbon conversion processes are rather well known, as, for instance, in reforming naphtha, it is understood that the same catalysts may be used as are used for cracking but under somewhat different temperature conditions.

In the copending Simpson et al. application Serial Number 361,440, filed October 16, 1940, now Patent No. 2,419,507, which, in turn, is a continuation-in-part of Serial Number 162,541, filed September 4, 1937, now abandoned, there is disclosed specifically a continuous system for carrying out catalytic cracking wherein a conversion zone remains continuously on conversion by having the solid catalyst particles move therethrough and a regeneration zone remains continuously on regeneration by having the spent catalyst particles move therethrough. In such a system, means must be devised for introducing and withdrawing the solid catalyst particles to and from the conversion zone without substantial flow of undesired gases to and from this zone. The present invention is directed particularly to an improvement in this feature and to a unitary system of improved design which has several operating advantages.

Therefore, it is an object of the present invention to provide a novel and efficient means for flowing solid catalyst particles through a continuous hydrocarbon conversion system.

A more specific object is to provide a system for introducing and withdrawing solid catalyst particles to and from a vapor-sealed hydrocarbon conversion zone (or a catalyst regeneration zone) which system does not require vapor-sealed catalyst valves, and, therefore, which has less tendency to crush the catalyst or to have mechanical failure or to cause variations in the pressure within the zone.

A specific object of this invention is the provision in a continuous conversion system of an improved method and apparatus for introduction of particle form contact material into a zone operating under gaseous reactant pressure as a gravitating feed leg while preventing escape of reactant gases from said zone.

Still another object is to provide a system having the above advantages which is applicable to operation in general wherein solid contact particles are introduced to a zone operating under pressure for contact with a gaseous material therein.

These and other objects will be apparent from the following description of the invention. In describing our invention, for the sake of simplicity, we shall speak primarily of catalytic cracking and of doing same in the presence of a clay catalyst. It is to be understood, however, that the invention has a wider scope, as indicated above.

According to the preferred embodiment of our invention, clay catalyst is flowed into the top part of a continuous cracking case through an elongated clay leg which extends above the case and which has a sufficient height that the pressure of the clay head in such clay leg is greater than the pressure in the case. The clay leg empties into an accumulation of clay at the point it enters the case so that the clay feed is even and the accumulation remains substantially constant. Preferably, clay fills the case, or substantially fills the case (allowing for the natural void spaces of the clay and the displacing effect of internal case structure, if any), and hence, a substantially compact column of catalyst is maintained in the case. This column of catalyst may then form the accumulation of clay into which the clay leg feeds, or it may be in continuous clay contact with such an accumulation so that this column of clay and the clay leg comprise a continuous body of clay. Clay from the clay leg then flows into the substantially compact column of catalyst in the conversion zone of the case at the same rate at which spent catalyst is withdrawn from near the bottom of the column, thereby maintaining a column of active catalyst within the case. Spent clay is preferably withdrawn from the bottom of the case by means of a compact leg of clay which also presents sufficient resistance to the flow of gases to restrict the flow of gases therethrough to a comparatively small quantity. In the unitary system, the regeneration case may be operated in an analogous manner; however, since this zone may be under atmospheric pressure and since neither substantial recovery of flue gas nor substantial exclusion of air from the zone is essential, a simpler means may be employed.

In order to have the hydrocarbon vapor flow through the substantially compact column of clay catalyst particles in the conversion case at a feasible rate but not flow through the clay leg seals when the two form one continuous body of clay, there preferably should be baffling structure or the like in the case to assist the flow of the gases therein. This baffling or gas-flow-assisting structure may take various forms and be more or less extensive, depending upon the size and shape of the particles.

Thus, in the copending Simpson et al. application Serial Number 362,882, filed October 25, 1940, now Patent 2,331,433, it is disclosed that where the catalyst particles in a continuous system are rather small (e. g., around 10 to 100 mesh, whereby breakage and crushing losses are lessened, baffling of compact columns of such catalyst should be used so as to provide substantially continuous gas paths through the column. Otherwise it is extremely difficult to flow the gas through the catalyst column at feasible rates and to prevent "boiling" of the clay. Baffling of this sort is desirable for any size catalyst but where catalysts having larger void spaces are used, there is less resistance to the passage of vapors, and, accordingly, baffling is less advantageous.

For instance, as the particle size approaches, say, 5 or 6 mesh and larger, and the particles are made sufficiently hard to properly withstand abrasion, very little, if any, baffling would be actually needed merely for getting gas through the catalyst column at a practical rate, even though it may be desirable to use same. Therefore, under such circumstances, baffling in the conversion case may be eliminated. This may be done even where the catalyst in the clay column and in the clay leg form one continuous body by having the clay leg of substantially narrower cross-section than the column of catalyst in the case so that it offers substantially more resistance to flow of gas therethrough, and this is particularly true where a blanket of inert gas is maintained around the lower end of the clay leg as will be described later herein.

In the present invention, therefore, the rule to be followed is that the column of catalyst in the conversion zone—if a column is used therein—should permit passage of gas therethrough at a feasible rate either because of particle size or assisting structure, while the clay leg should be of such form and/or of such compactness as to offer substantially more resistance to gas flow so that gas will not pass out the leg but can be drawn off independently from the top of the conversion zone. We feel it is most desirable to employ baffling, and we prefer to use baffling structure in the conversion zone of the type covered in the above-mentioned application Serial Number 362,882, now Patent 2,331,433.

As stated above, the clay feed leg should be of sufficient height that the clay head in the leg is greater than the pressure in the case at the point of clay inlet. Thus we have found, for instance, that for clay or catalyst of 10–48 mesh and about 0.66 apparent specific gravity (41 lbs. per cu. ft.), it is possible to flow clay freely through a six inch pipe size leg at rates of at least 160 pounds per minute into a flue gas sealed system by establishing a clay head of 5 to 6 feet for each pound per square inch of pressure prevailing in the hopper into which the clay leg feeds. Therefore, assume, for example, that the apparatus—other than the reactor—is nominally operating at atmospheric pressure, and that the actual pressure being maintained in the exit vapor zone of the reactor is about 3 pounds per square inch gauge. Then it is possible to establish proper clay flow into the apparatus by providing a clay leg of 15 to 18 feet or more, between the main supply hopper at the top of the leg and the reactor hopper at the top of the reactor and into which the clay leg feeds. It, of course, will be apparent that where a catalyst is employed of different size and density than the 10–48 mesh clay mentioned above, that there will be an obvious variation in the minimum required number of feet of clay leg per square inch of pressure in the case. Moreover, the rate of clay flow can be increased both by increasing the head of clay and by enlarging the pipe through which it flows. The rates of clay flow that can be maintained into a given system are dependent on the clay size and density, the cross-section of the leg, the length of the leg and the nature of the vapors in the seal system. Preferably the catalyst feed leg should be of a length within the range 3 to 8 feet per pound per square inch pressure differential between its upper and lower ends.

Figure 2:
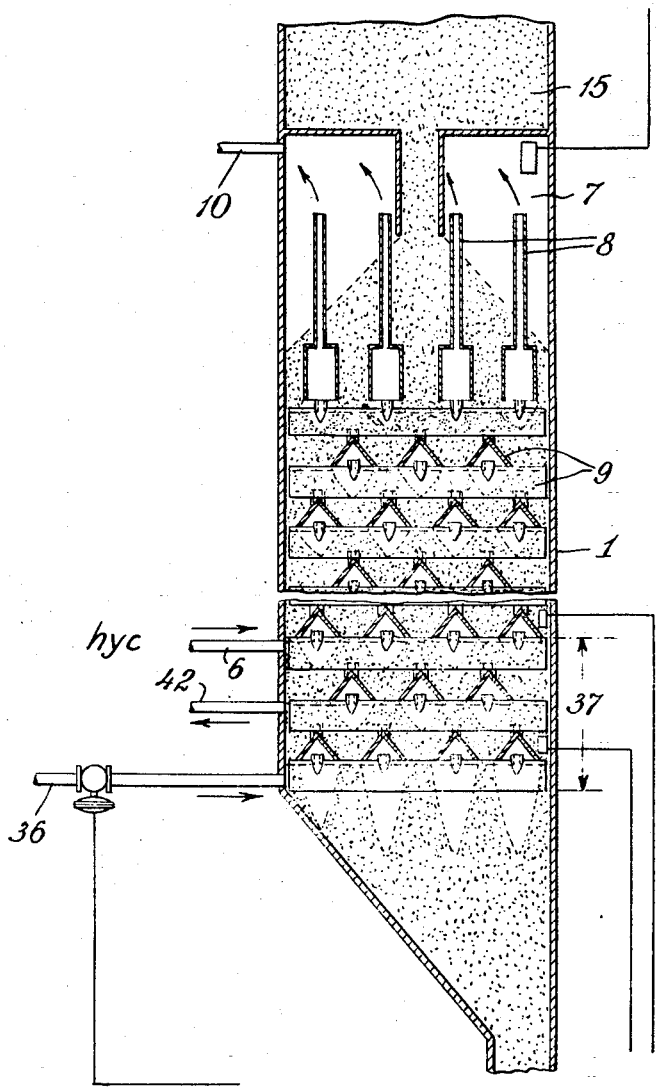

The invention will be described further by reference to the accompanying drawings, Figure 1 of which shows a preferred embodiment of our system, while Figure 2 shows detail thereof, both in diagram form.

The system shown in the drawing comprises a conversion case 1, with a clay feed leg 2 therefor, a regeneration case 3, and catalyst elevators 4 and 5 for returning catalyst to the conversion case 1 and the regeneration case 2, respectively.

In operation, hydrocarbon charge stock which has been vaporized and heated to reaction temperature in a suitable furnace (not shown) is introduced to case 1, by line 6. These vapors pass upwardly through the case under cracking conditions in contact with a baffled column of catalyst moving downwardly therethrough, thereby effecting the desired cracking. Cracked products are withdrawn from the top of the baffles 9 into space 7 through vents 8. These withdrawn vapors then pass through line 10 to cyclone separator 11 for separation of entrained catalyst particles. Vapors leaving separator 11 at 12 are passed to a suitable distillation system (not shown), while removed catalyst particles leaving separator 11 by line 13 may be discarded or returned to the system, as desired. In the distillation system the cracked products are separated in conventional manner into a cracked gasoline and a cycle stock fraction. The cycle stock fraction may be recycled, if desired, to the conversion zone for further cracking.

Fresh or regenerated catalyst contained in main hopper 14 feeds in a compact column through clay leg 2 into the accumulation of clay 15 in reactor hopper 16. The leg 2 is of sufficient height to permit free clay flow at the desired rates against the pressure in hopper 16, without the use of any clay valve, and the flow of gas through the clay leg countercurrent to the clay will be negligible, due to the enormous frictional resistance of the fine, closely-packed clay particles. An atmosphere of steam or inert gas maintained in the reactor hopper prevents the passage of any hydrocarbon vapors up through the clay leg.

Spent clay at the bottom of reactor 1 passes in the form of a compact column of clay through clay leg 17 to the bottom of elevator 5. Since clay leg 17 also presents more resistance to gas flow than the baffled column of catalyst in case 1, there is a negligible loss of gases therethrough. A valve or orifice 18 may be placed in leg 17 in order to regulate the rate of flow of catalyst.

Catalyst elevator 5, as well as elevator 4, may be of any suitable type, such as a bucket-type conveyer or a skip-hoist. Spent catalyst at the bottom of conveyer 5 is lifted by this conveyer to the top thereof from where it passes through clay line 19 to the regeneration case hopper 21 in the top of regeneration case 3. Spent catalyst passes from hopper 21 on down through case 3 under regeneration conditions so as to be properly regenerated by the time it reaches the bottom of the case. The regeneration is effected by air introduced by line 22 near the bottom of the case and which rises therethrough. Flue gases resulting from the regeneration process are withdrawn from the top of baffles 20 through vents 23 into space 25 from where they pass through line 26 into cyclone separator 27 for separation of any entrained catalyst. Catalyst particles leaving separator 27 through line 28 may be returned to the system or discarded. Flue gas in line 29 may be vented or used for purging in the system as later described. Any flue gas which may pass upwardly through clay line 19 is vented from the top of elevator 5.

Regenerated clay leaving the bottom of case 3 passes through clay line 30, which may contain clay flow-rate valve 31, into the bottom of elevator 4. Gases in the case 3 are prevented from passing downwardly into elevator 4, preferably by constructing clay line 30 similarly to clay leg 17 of case 1. The regenerated clay pouring into the bottom of elevator 4 is raised by this elevator into clay line 32 at the top of the elevator and passes through this line back into main hopper 14 for reuse in the system. Any flue gas carried by the catalyst into elevator 4 may be vented at the top thereof. Fresh make-up catalyst may be added to the system as needed, and fines withdrawn from the system, as required, in suitable manner.

Accordingly, it will be seen that catalyst flows through the complete cycle of the system without the necessity of vapor-sealed catalyst valves and yet in such fashion that proper vapor seals are maintained. Moreover, a more constant pressure may be maintained in the conversion case by the present system than where catalyst is being fed into the case and removed from the case through vapor-sealed valves.

Another important feature of the invention resides in the use of blankets of inert gas at the top and bottom of the conversion case as further insurance against leakage of hydrocarbon vapors through the leg of catalyst entering or leaving the case. This inert gas may be the flue gas withdrawn from regeneration case 3 and leaving separator 27 at 29. However, any other inert gas may be used, such as, for example, steam. This gas is passed through line 33 into reactor hopper 16 so as to create a slightly higher pressure therein than exists in the upper hydrocarbon vapor space 7 of case 1, whereby it will be impossible for hydrocarbon vapors to enter hopper 16. On the other hand, only a small amount of the inert gas will go into the vapor space 7 of case 1, and out with the cracked products since the pressure differential is very small and there is a considerable resistance offered to such gas flow by the clay. A differential pressure controller 34 also is provided so that it will automatically close valve 35 in clay leg 2 if the positive differential pressure in the reactor hopper 16 falls below a fixed minimum.

Similarly, inert gas may be fed through line 36 into purge section 37 at the bottom of case 1, so as to maintain a slightly higher pressure therein than exists in the case at the hydrocarbon vapor inlet 6. Differential pressure controller 38 is devised to automatically shut valve 39 in clay leg 17 if this positive pressure differential falls below a certain minimum. Thus, it is to be noted that the inert gas at the bottom of case 1, not only serves to blanket the hydrocarbon vapors from the clay withdrawal leg but also serves to effect purging of the spent catalyst of hydrocarbon material before it passes to the regeneration case 3. Purging of the regenerated catalyst of regeneration gases in case 3, if desired, before returning such catalyst to case 1, may be effected in a similar manner by introducing purge gas through line 40. In both of these purging operations, as shown, substantially all of the purge gases will pass upwardly through the cases and out with the gaseous products. If desired, the purge gases can be collected separately by inserting suitable collecting headers below points 6 or 22, such as that shown in Figure 2, attached to exit pipe 42.

As another added precaution, inert purge gas, such as, for example, flue gas from cyclone separator 27, is passed through line 41 into the bottom of elevators 4 and 5, the gas being vented at the top of the elevators. This feature provides a safety seal between all parts of the clay transfer system. Therefore, it will be seen that purging may be effected in the bottom part of both cases and in both elevators. On the other hand, it may be eliminated at all these points if found unnecessary, or it may be practised only at such points as are necessary or desirable. For example, purging might be conducted only in the elevators. Further, purging of hydrocarbon material from the spent catalyst passing from the conversion case to the regeneration case is required more than purging of the regenerated catalyst. Accordingly, purging of spent catalyst only may be practiced. Also, in this connection, it has been found that when steam is used for the seal gas in chamber 16, disturbances may occur in the operation of the clay leg. In certain cases the disturbance may be severe enough to actually interrupt the flow of clay through leg 2 into hopper 16. This effect is apparently due to the adsorption of steam by the clay in clay leg 2. This effect usually takes place whenever the adsorbent catalyst has been heated to a temperature substantially in excess of that in the reactor clay feed leg. Such conditions invariably are present in the catalyst regenerator. If the clay is thoroughly saturated with steam prior to entering clay leg 2 the disturbance through the use of steam in hopper 16 does not occur. The clay may be saturated with steam prior to entering clay leg 2 by introducing steam into hopper 14, elevator 4 or purge section 40. The amount of steam required to saturate the catalyst will vary depending upon the particular catalyst involved, the temperature to which it has been subjected and the pressure and temperature at which it is subsequently contacted with steam. As an example in a continuous catalytic conversion operation for the catalytic cracking conversion of hydrocarbons in the presence of a moving clay-type filtrol catalyst, the catalyst in the regenerator reached temperatures of the order of 900 to about 1150° F. When this catalyst, moving at a rate of about 100 tons per hour, was passed through a 20" diameter, 75 feet long feed leg in a reactor seal zone operating under a steam pressure of the order of 10 pounds per square inch gauge, it was found that the catalyst in the feed leg would periodically tend to bridge so as to stop the catalyst flow in the feed leg. To overcome this steam was introduced into the purge section at the bottom of the regeneration zone, where the temperature was substantially below the peak temperature reached in the regeneration zone, for example 850–1000° F., at a rate of about 2000 pounds of steam per hour. The catalyst thus substantially saturated with steam at a temperature substantially below the peak regeneration temperature passed without substantial cooling to the feed leg. The tendency for catalyst bridging in the feed leg to the reactor seal zone then disappeared. For the best results the temperature at which the solid material is saturated with steam should not be substantially above the temperature existing in the feed leg and reactor seal zone. The residence time required for catalyst in the presence of steam to substantially saturate the catalyst with steam may vary depending upon condition and catalysts involved. In the above example a residence time of the order of 5 minutes was found to be satisfactory.

Figure 2 shows the detailed internal arrangement at the bottom of the reactor, which is the same in reactor and regenerator.

It is to be understood that in the present unitary system, the catalyst should be passed substantially directly from each case to the other case so that the catalyst is still in a heated condition when it reaches the case to which it is being sent. In this way, a substantial economy in operation is realized.

As noted hereinabove, conditions and catalysts for catalytic cracking and other hydrocarbon reactions are known. Moreover, conditions for regenerating the catalysts are known. Such operations are shown, for instance, in the various Simpson et al. patents and applications mentioned hereinabove. Furthermore, it is to be understood any continuous catalyst regeneration process may be used in the present unitary system. However, it is preferred to use a process of the type disclosed in the Simpson et al. application Serial No. 362,882, now Patent 2,331,433.

We claim:

1. In a cyclic process for the conversion of hydrocarbons in contact with a particle-form adsorbent contact mass material wherein the adsorbent is passed downwardly through a reaction zone in which it is contacted with hydrocarbons under reaction conditions of temperature and pressure and after removal from the reaction zone the adsorbent is regenerated while passing through a regeneration zone wherein contaminant deposited thereon in said reaction zone is burned and then returned to the reaction zone, that improvement which permits transfer of adsorbent from the regeneration zone to the reaction zone while preventing substantial escape of hydrocarbon gas through the adsorbent inlet means without resorting to a vapor sealing valve which comprises the following steps, withdrawing regenerated adsorbent from said regeneration zone, thoroughly contacting said regenerated adsorbent with steam, introducing the adsorbent into the reaction zone through a compact elongated stream of said adsorbent particles extending upwardly above said reaction zone to an elevation sufficient to provide a head of adsorbent particles great enough to force it into said reaction zone and maintaining a blanket of steam in said elongated stream adjacent its lower end at a pressure above the hydrocarbon pressure in the upper section of said reaction zone.

2. A continuous cyclic process for the catalytic conversion of hydrocarbons which comprises: passing a particle-form adsorbent catalyst through a confined conversion zone while contacting it therein under suitable conversion conditions of temperature and pressure with hydrocarbons to effect the conversion thereof, passing spent catalyst from said conversion zone to a regeneration zone while contacting it therein with a combustion supporting gas to burn off from said catalyst the carbonaceous contaminant deposited thereon in said conversion zone, thoroughly contacting the regenerated catalyst at a temperature below the maximum temperature reached in said regeneration zone with steam, passing said steam contacted catalyst to a reactor supply zone maintained under a pressure substantially below that in said conversion zone, passing said catalyst from said supply zone to the upper section of said conversion zone as a confined gravity flowing stream, said supply zone being sufficiently elevated above said conversion zone to provide a pressure sufficient at the bottom of said stream to force the catalyst into said conversion zone against the pressure existing therein, and maintaining an atmosphere of steam adjacent the lower end of said stream at a pressure above the hydrocarbon pressure within the upper section of said conversion zone so as to substantially exclude hydrocarbon vapor from said stream.

3. A continuous cyclic process for the catalytic conversion of hydrocarbons which comprises: passing a particle-form adsorbent catalyst at a suitable conversion temperature downwardly through a conversion zone as a substantially compact column, passing hydrocarbon reactant through said zone in contact with said column to effect conversion of said reactant, withdrawing spent contaminant bearing catalyst from the lower section of said conversion zone and passing it through a regeneration zone, passing a combustion supporting gas into contact with said catalyst in said regenerating zone to burn the contaminant on said catalyst, withdrawing regenerated catalyst from said regeneration zone and contacting it with steam to substantially saturate said catalyst with steam at a temperature substantially below the maximum temperature to which said catalyst was heated in said regeneration zone, feeding the steam contacted catalyst into said conversion zone through a confined flowing stream extending upwardly from the column of catalyst within said conversion zone to a sufficient height to provide at the bottom of said flowing stream a head of catalyst great enough to force the catalyst into said conversion zone against the pressure existing therein, and subjecting said stream adjacent its lower end to an atmosphere of steam at a pressure above the hydrocarbon pressure within the upper section of said conversion zone so as to substantially exclude hydrocarbon vapor from said stream.

4. A continuous cyclic process for the catalytic conversion of hydrocarbons which comprises: passing a particle-form adsorbent catalyst at a suitable conversion temperature downwardly through a conversion zone as a substantially compact column, passing hydrocarbon reactant through said zone in contact with said column to effect conversion of said reactant, withdrawing spent contaminant bearing catalyst from the lower section of said conversion zone and passing it through a regeneration zone, passing a combustion supporting gas into contact with said catalyst in said regenerating zone to burn the contaminant on said catalyst, withdrawing regenerated catalyst from said regeneration zone and contacting it with steam to substantially saturate said catalyst with steam at a temperature substantially below the maximum temperature to which said catalyst was heated in said regeneration zone, passing said steam contacted catalyst to an accumulation zone maintained above said conversion zone and maintained at a pressure substantially below that existing in said conversion zone, passing said catalyst from said accumulation zone to the upper section of said conversion zone as a substantially compact confined stream of gravitating particles, and introducing steam into said stream at a level between its ends and near its lower end at a pressure above the hydrocarbon pressure within the upper section of said conversion zone; wherein the vertical length of said stream is within the range about 3 to 8 feet per pound of gaseous pressure differential between said accumulation zone and said level of steam introduction into said stream.

5. In a continuous process for the catalytic conversion of hydrocarbons a method for introducing a particle-form adsorbent catalyst, which has been subjected to regeneration at an elevated temperature, to a hydrocarbon conversion zone maintained under a substantial gaseous hydrocarbon pressure which method comprises: contacting said catalyst at a temperature below the maximum temperature to which it was subjected during regeneration with steam to substantially saturate said catalyst therewith, feeding said catalyst into the upper end of said conversion zone from a substantially compact, confined stream of said catalyst extending upwardly from said conversion zone to a sufficient height to insure gravity flow of catalyst into said conversion zone against the pressure therein and subjecting said stream to an atmosphere of steam adjacent its lower end at a pressure above that of the hydrocarbon pressure in the upper section of said conversion zone so as to substantially exclude hydrocarbon vapor from said stream.

6. A method for catalytic conversion of hydrocarbons comprising the steps: maintaining a substantially compact column of particle-form adsorbent catalyst within a confined conversion zone, passing fluid hydrocarbons into contact with said catalyst in said conversion zone to effect conversion of said hydrocarbons, continuously withdrawing catalyst from the lower section of said zone, maintaining a substantially compact, elongated, confined stream of said catalyst extending substantially vertically upwardly from said column to a body of said catalyst thereabove, said body of catalyst being maintained at a pressure below that in said conversion zone and being sufficiently elevated above said conversion zone to insure the flow of catalyst downwardly in said confined stream and into said conversion zone while offering substantial resistance to gas flow upwardly through said confined stream, subjecting a catalyst which has been regenerated at elevated temperatures to contact with steam to substantially thoroughly saturate said catalyst with steam at a temperature suitable for hydrocarbon conversion but substantially below the maximum temperature to which said catalyst was heated during its regeneration, supplying said steam saturated catalyst to said supply body and introducing steam into said confined stream at a level near its lower end at a pressure above that of the hydrocarbons in the upper section of the conversion zone.

7. The method for conducting a gas-solid contacting process which comprises: maintaining a substantially compact column of particle-form adsorbent material within a contacting zone while contacting it therein with a contacting gas, withdrawing contacted adsorbent from the lower section of said column, maintaining a substantially compact, confined stream of said adsorbent extending upwardly from said column to a sufficient height thereabove to insure the flow of adsorbent downwardly in said confined stream and into said contacting zone, introducing steam into said stream at at least one level substantially below its upper end at a pressure above that of said contacting gas in the upper section of said contacting zone, heating adsorbent material in a separate zone to an elevated temperature withdrawing adsorbent from said heating zone, subjecting said adsorbent from said heating zone to substantially thorough contact with steam at a temperature below the maximum temperature reached in said heating zone and supplying said steam contacted adsorbent to the upper end of said confined stream.

8. The method of conducting a continuous cyclic gas-solid contacting process which comprises passing particle-form solid adsorbent material downwardly through a gas-solid contacting zone while contacting it with a contacting gas, withdrawing contacted solid from said contacting zone and passing it to a second zone wherein it is heated to put it into condition for reuse in said contacting zone, withdrawing said adsorbent materal from said second zone and contacting it with steam to substantially saturate said adsorbent with steam, introducing the steam contacted adsorbent into said contacting zone as a substantially compact, confined stream extending upwardly above said contacting zone to a sufficient vertical height to force said adsorbent into said contacting zone against the pressure therein and introducing steam into said confined stream at a level substantially below its upper end at a pressure above that of the contacting gas in the upper section of said contacting zone.

9. In a continuous system for catalytic conversion of fluid hydrocarbons wherein a particle-form adsorbent catalyst is passed cyclically through a reactor and a regenerator the improvement which comprises: a reactor vessel, means to maintain a gaseous pressure in said reactor, a catalyst supply hopper, vented to the atmosphere, positioned at a height above said reactor within the range 3 to 8 feet per pound of gaseous pressure differential between said hopper and the upper section of said reactor, at least one conduit extending downwardly from said hopper to said reactor, means to maintain an atmosphere of steam adjacent the lower end of said conduit, means to supply catalyst from said regenerator to said supply hopper and means to contact said regenerated catalyst with steam in sufficient amount to saturate said catalyst with steam at a point in the system before it reaches the upper end of said feed conduit.

10. An apparatus for continuous catalytic conversion of hydrocarbons which comprises: a reaction vessel adapted to confine a substantially compact column of catalyst particles, fluid reactant inlet means to said vessel and fluid reactant outlet means therefrom, an inlet for catalyst at the upper end of said vessel and an outlet for catalyst at its lower end, a separate regenerator adapted to confine a substantially compact column of catalyst, gas inlet means to said regenerator, gas outlet means from said regenerator, a catalyst inlet to the top of said regenerator and a catalyst outlet from the bottom of said regenerator, a steam inlet to said regenerator below the level of said gas inlet and outlet means, an accumulation hopper, vented to the atmosphere, positioned above said reaction vessel, a conduit extending substantially vertically from said hopper to said catalyst inlet to said reaction vessel, said hopper being positioned above said reaction vessel at least a distance corresponding to a column of said catalyst having a greater head at its bottom than the gaseous pressure in said reactor vessel, means to maintain a blanket of steam adjacent the lower end of said conduit.

11. A method of conducting a cyclic operation at controlled elevated temperatures comprising a catalytic petroleum conversion reaction wherein moving solid catalyst particles are intimately contacted with a moving stream of petroleum oil to be converted and a regeneration reaction wherein spent catalyst from said conversion reaction is regenerated by intimately contacting the spent particles with a gaseous regenerating agent while both are moving, which comprises flowing the active catalytic particles through a conversion zone in intimate contact with said petroleum oil under conversion conditions so as to convert the oil and thereby cause catalyst particles to become spent from deposited carbonaceous material, purging said spent particles with an inert gaseous medium to remove some of the carbonaceous material associated therewith, passing said purged spent particles into a regenerating zone without permitting them to cool to atmospheric temperature, flowing said spent particles through said regenerating zone in intimate contact with a moving stream of said gaseous regenerating agent at controlled, elevated regenerating temperatures within the range about 900° F. to 1150° F. so as to regenerate the particles, thoroughly contacting the regenerated particles with steam at a temperature substantially below the maximum temperature reached in said regeneration zone, controlling the time of contact of said regenerated particles with steam and the amount of steam contacted with said particles during said contacting to effect substantial saturation of said particles with steam at a temperature substantially below the maximum temperature reached in said regeneration zone, passing a stream of the steam saturated, regenerated particles to said conversion zone as the catalytic material supply thereto while maintaining a blanket of inert seal gas adjacent the location where said stream of particles enters said conversion zone to prevent the escape of petroleum oil from the conversion zone through said stream.

12. A method of conducting a cyclic operation at controlled elevated temperatures comprising a catalytic petroleum conversion reaction wherein moving solid catalyst particles are intimately contacted with a moving stream of petroleum oil to be converted and a regeneration reaction wherein spent catalyst from said conversion reaction is regenerated by intimately contacting the spent particles with a gaseous regenerating agent while both are moving, which comprises flowing the active catalytic particles through a conversion zone in intimate contact with said petroleum oil under conversion conditions so as to convert the oil and thereby cause catalyst particles to become spent from deposited carbonaceous material, purging said spent particles with an inert gaseous medium to remove some of the carbonaceous material associated therewith, passing said purged spent particles into a regenerating zone without permitting them to cool to atmospheric temperature, flowing said spent particles through said regenerating zone in intimate contact with a moving stream of said gaseous regenerating agent at controlled, elevated regenerating temperatures within the range about 900° F. to 1150° F. so as to regenerate the particles, passing the regenerated particles at a temperature within the range about 850° F. to 1000° F. into intimate contact with steam for a period of the order of five minutes, the amount of steam contacting said particles being of the order of at least one pound of steam per hundred pounds of solid catalytic material, flowing a stream of the steam contacted, regenerated particles to said conversion zone as the catalytic material supply thereto while maintaining a blanket of steam seal gas adjacent the location where said stream of particles enters said conversion zone to prevent the escape of petroleum oil from the conversion zone through said stream.

13. A continuous cyclic process for the catalytic conversion of hydrocarbons which comprises: passing a particle-form adsorbent catalyst at a suitable conversion temperature downwardly through a conversion zone as a substantially compact column, passing hydrocarbon reactant through said zone in contact with said column to effect conversion of said reactant, withdrawing spent contaminant bearing catalyst from the lower section of said conversion zone and passing it through a regeneration zone, passing a combustion supporting gas into contact with said catalyst in said regenerating zone to burn the contaminant on said catalyst, and causing said catalyst to reach a peak temperature within the range about 900° F. to 1150° F., withdrawing regenerated catalyst from said regeneration zone and contacting it with steam to substantially saturate said catalyst with steam at a temperature substantially below the maximum temperature to which said catalyst was heated in said regeneration zone within the range about 850° F. to 1000° F., feeding the steam contacted catalyst into said conversion zone through a confined flowing stream extending upwardly from the column of catalyst within said conversion zone to a sufficient height to provide at the bottom of said flowing stream a head of catalyst great enough to force the catalyst into said conversion zone against the pressure existing therein, and subjecting said stream adjacent its lower end to an inert gaseous atmosphere at a pressure above the hydrocarbon pressure within the upper section of said conversion zone and substantially above the gaseous pressure at the upper end of said confined stream of catalyst flowing into said conversion zone so as to substantially exclude hydrocarbon vapor from said stream.

THOMAS P. SIMPSON.
JOHN W. PAYNE.
JOHN A. CROWLEY, JR.

REFERENCES CITED

The following references are of record in the file of this patent:

UNITED STATES PATENTS

| Number | Name | Date |
|---|---|---|
| 2,246,654 | Arveson | June 24, 1941 |
| 2,351,214 | Kaufmann | June 13, 1944 |
| 2,379,408 | Arveson | July 3, 1945 |
| 2,385,446 | Jewell | Sept. 25, 1945 |